(12) United States Patent
Bongiovanni et al.

(10) Patent No.: US 8,389,631 B2
(45) Date of Patent: Mar. 5, 2013

(54) BISMALEIMIDE RESIN SYSTEM WITH IMPROVED MANUFACTURING PROPERTIES

(75) Inventors: Christopher Bongiovanni, Long Beach, CA (US); Jack Boyd, Silverado, CA (US); Christopher Pederson, Orange, CA (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/336,997

(22) Filed: Dec. 17, 2008

(65) Prior Publication Data

US 2009/0215961 A1    Aug. 27, 2009

Related U.S. Application Data

(63) Continuation of application No. 11/398,290, filed on Apr. 5, 2006, now abandoned.

(51) Int. Cl.
*C08L 71/10* (2006.01)
(52) U.S. Cl. ........ 525/132; 526/262; 526/333; 526/334; 528/322
(58) Field of Classification Search .................. 526/262, 526/333, 334; 528/322; 525/132
See application file for complete search history.

(56) References Cited

U.S. PATENT DOCUMENTS 6,313,248 B1 * 11/2001 Boyd et al. .................... 526/262

* cited by examiner

*Primary Examiner* — Gregory Listvoyb
(74) *Attorney, Agent, or Firm* — David LeCroy

(57) ABSTRACT

The present invention is a thermosetting bismaleimide resin system comprising a liquid phase and a solid phase where the non-crystallizing liquid phase contains the curing agents diallyl ether of a substantially aromatic radical and a bis(alkenylphenoxy) ether of a substantially aromatic radical along with a substantially aromatic bismaleimide as a particle slurry and optionally a free radical inhibitor.

The curing agents are non-crystallizing compositions for use in bismaleimide resin formulations to increase the thermal durability of a cured resin composite as shown by reduced microcracking as measured by reduced weight loss after thermal aging. The present invention resists microcracking over bismaleimide resin systems which incorporate other curing agents or combinations of curing agents.

The present invention further provides a bismaleimide resin formulation suitable to make prepregs with reduced crystallization for reduced viscosity supporting improved manufacturing properties and improved tack.

15 Claims, No Drawings

BISMALEIMIDE RESIN SYSTEM WITH IMPROVED MANUFACTURING PROPERTIES

This application is a continuation of U.S. application Ser. No. 11/398,290, filed Apr. 5, 2006 now abandoned.

BACKGROUND OF THE INVENTION

1. Field of the Invention

The present invention relates to bismaleimide (BMI) resins for use in complex and diverse high performance composite applications. In preferred embodiments, this invention relates to a composition of BMI with improved tack and thermal durability through the incorporation of a curing agent for bismaleimides that unexpectedly is non-crystallizing. The present invention further relates to BMI resin formulations suitable to make prepregs with reduced viscosity for improved prepreg manufacturing, handling properties and handling stability.

2. Description of the Related Art

Fiber reinforced, polymer matrix laminated composite structures (PMCs) are widely used in a number of applications and increasing amounts of composite structures are being used in high performance aerospace applications.

Most composite parts in the aerospace industry use epoxy resins because of epoxy's good combination of mechanical properties, wide service temperature range, and ease of part manufacture. However, some composite applications require higher thermal durability of the finished composite than traditional epoxies can provide.

Epoxy PMCs cannot be used in extreme environments such as high temperature applications, above about 180° C., because they lack adequate thermal durability.

A widely used high service temperature PMC resin currently used is PMR-15, a version of which is sold as CYCOM® 2237 by Cytec Engineered Materials Inc. CYCOM® 2237 has a service temperature of about 288° C. for exposure of less than 100 hours to about 232° C. for exposure of more than 2000 hours. However, since the development of PMR-15 there has been extensive work to find a PMR-15 replacement to overcome its severe limitations restricting its use. The limitations of PMR-15 are microcracks and processing difficulty. An additional limitation with PMR-15 is that it contains 4,4'-methylenedianiline, MDA, a health hazard requiring extensive environmental controls.

Where aerospace applications require service temperature beyond the capability of epoxy resins, bismaleimides resins are gaining acceptance because of their epoxy-like processing properties and higher service temperature. Current BMI based resin composite systems offer service temperatures in the range of 149° C. to 232° C. providing excellent mechanical properties such as no micro-cracking and no environmental hazards. For example, Cycom® 5250-4 resin prepreg is offered by Cytec Engineered Materials Inc., as a high temperature primary construction material with a service temperature of about 232° C. for exposure of less than about 100 hours to about 190° C. for exposure of more than 2000 hours.

BMI resins have been modified to improve toughness and manufacturing handling characteristics such as tack through the co-reaction of 2, 2'-diallylbisphenol A (DABA) with substantially aromatic bismaleimides, most specifically bismaleimide incorporating 4,4'-methylenedianaline (MDA-BMI). This process is more fully described in U.S. Pat. No. 4,100, 140. However, this system has inadequate thermal durability for 232° C. use as identified by unacceptable weight loss and micro-cracking. Thermal aging at 232° C. demonstrates unacceptable thermal durability for the desired exposure of 2000 hours for many applications.

Additional BMI resin compounds are more fully described in U.S. Pat. No. 5,003,018 and U.S. Pat. No. 5,747,615, which technologies incorporate additional solid, undissolved, BMI to improve tack and drape. These BMI resins give superior mechanical properties, including high service temperature performance, and ease of processing into complex composite parts, but remain inadequate for 232° C. use in excess of 2000 hours as identified by unacceptable weight loss and microcracking. In addition, while this art generally discloses that 1,6-hexamethylenediamine bismaleimide (HMDA-BMI) can be incorporated into a BMI resin system, the art does not teach that such an addition can be modified to enhance thermal durability or reduce viscosity to improve tack. Indeed, the art suggests that incorporation of an aliphatic BMI such as HMDA-BMI reduces the Tg and would thus, not be appropriate.

Other improvements in BMI technology were advanced to improve tack, but these advances did not sufficiently reduce the viscosity for processing and the tack remained unacceptable for high temperature applications. The improvement is disclosed as a eutectic blend of the substantially aromatic bismaleimides from MDA-BMI and toluene diamine (TDA-BMI) with an aliphatic bismaleimide derived form 2,2,4-trimethlyhexamethylene diamine (TMH-BMI) in a ratio of about 50/25/15 for MDA-BMI/TDA-BMI/TMH-BMI. These formulations are described more fully in U.S. Pat. No. 4,211, 861 and U.S. Pat. No. 4,211,860.

Another limitation of current BMI resin formulations is that additional toughening agents such as thermoplastics are not able to be added to current BMI resin systems because of the inherent high viscosity of current BMI resins systems not allowing the addition of further materials that will further increase the viscosity. The addition of thermoplastics to current BMI resin systems increases the resin viscosity to such a level that the resulting resin viscosity is out of range of practical application.

Current BMI resin systems also have the additional limitation of being unable to fully impregnate carbon fiber prepregs because they contain a high solid BMI content. Current BMI based resin systems contain 35 wt % to 46 wt % undissolved solid BMI, as a slurry in the resin making them notoriously difficult to fully impregnate. As such, to fully impregnate a prepreg incorporating a BMI resin, high processing temperatures are required to reduce the viscosity of the liquid phase component of the resin system and dissolve more solids. Nonetheless, the high solid content of the resin makes manufacturing applications difficult and requires use of low speeds on automatic tape lay-up during part manufacturing. The solid BMI particles in the resin are taught to be necessary to ensure sufficient tack for lay-up, but with more solid particles, the out time is reduced to often less than two days before the tack is reduced to unusable levels.

The present invention solves many of these issues by providing a high temperature composite with increased tack and reduced viscosity to allow for a useable BMI resin based prepreg. This system enhances the mechanical and thermal performance characteristics of the BMI resin in the final composite. Additionally, by reducing the overall viscosity, the present invention allows the incorporation of more total BMI in the resin system to improve mechanical properties as well as the possible incorporation of a thermoplastic.

SUMMARY OF THE INVENTION

The present invention provides for a combination of curing agents for BMI monomers that unexpectedly provide a resin composition where the liquid phase component is stable to crystallization and improves tack and thermal durability. The curing agent diallyl ether of bisphenol A (marketed as Matrimid 2292 by Huntsman) unexpectedly inhibits the crystallization of bis(alkenylphenoxy) ether of a substantially aromatic radical, in particular, 4,4'-(2-propenylphenoxy) benzophenone (marketed as TM123 by Technochemie).

A preferred embodiment of the present invention is a thermosetting bismaleimide resin system comprising a liquid phase and a solid phase where the non-crystallizing liquid phase contains the curing agents diallyl ether of a substantially aromatic radical and a bis(alkenylphenoxy) ether of a substantially aromatic radical along with a substantially aromatic BMI as a particle slurry and optionally a free radical inhibitor.

The incorporation of diallyl ether of a substantially aromatic radical to overcome limitations of current BMI systems is unexpected because combinations of bis(alkenylphenoxy) ether of a substantially aromatic radical with increased amounts of 2,2'-diallyl bisphenol A increases crystal formation rather than decreasing crystallization. As such, it would be expected that its precursor, diallyl ether of a substantially aromatic radical, would also increase crystallization.

The present invention provides a higher service temperature with increased thermal durability than the prior art. The invention also provides the advantage of curing without volatiles, contains no toxic components, and has the ability to be used in resin infusion applications; a significant advantage over PMR-15 and prior BMI resin systems.

A further embodiment of the present invention is for prepregs using the resin of the present invention to provide stable tack, characterized by nominal to no crystallization of the uncured liquid resin, and excellent thermal durability of the cured resin composite system.

A further embodiment of the present invention provides for a bismaleimide resin composition comprising 20% to 80% by weight of particulate substantially aromatic BMI monomers slurry mixed with a liquid monomer phase component of the resin composition. The solid phase is primarily micronized particulate BMI. The non-crystallizing liquid phase is preferably a combination of diallyl ether of a substantially aromatic radical and bis(alkenylphenoxy) ether of a substantially aromatic radical with BMI resins in solution.

A further embodiment of the present invention provides for a BMI resin composition comprising about 2 wt % to 30 wt % diallyl ether of a substantially aromatic radical; about 15 wt % to 60 wt % bis(alkenylphenoxy) ether of a substantially aromatic radical; about 20 wt % to 80 wt % particulate substantially aromatic BMI; and wherein the resin displays improved thermal durability.

The present invention provides for a BMI resin composition having a lower viscosity. Lower resin viscosity improves certain uncured characteristics such as improved processing in resin infusion processes. It also improves BMI prepreg and adhesive handling characteristics such as tack and drape. The lower resin viscosity has further advantages of allowing modification of the resin by dissolving thermoplastics to improve the uncured and cured resin characteristics while maintaining the resin viscosity at usable levels.

DETAILED DESCRIPTION OF THE PREFERRED EMBODIMENTS

The present invention involves BMI resin formulations that incorporate substantially aromatic BMI monomer curing agents with substantially aromatic BMI resins to reduce the viscosity and crystallization of the uncured resin, and microcracking of the cured composite as measured by reduced weight loss after thermal aging, while maintaining high Tg. The reduced viscosity of the uncured resin aids in the processing of the prepreg into complex shapes by hand or automated processing methods.

The present invention combines a diallyl ether of a substantially aromatic radical with a bis(alkenylphenoxy) ether of a substantially aromatic radical, a solid BMI resin and optionally a free radical inhibitor to create a BMI resin with uncured low viscosity and resistance to crystallization and cured high Tg.

The diallyl ether of a substantially aromatic radical is preferably the diallyl ether of bisphenol A and is more preferably a monomer. Formula 1 is a schematic representation of diallyl ether of a substantially aromatic radical acceptable for the present invention.

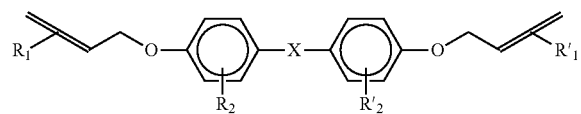

dially ether of a substantially aromatic radical

Formula 1

Wherein $R_1$, $R_1'$=hydrogen, alkyl, or aromatic; $R_2$, $R_2'$=hydrogen, halogen, alkyl, phenoxy, or alkyloxy; and where X would be a direct bond or one of the following functional groups:

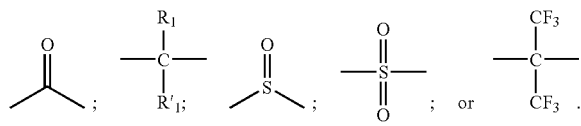

The diallyl ether of a substantially aromatic radical can be in an amount from 5% to about 90% by weight and more preferably about 10% to about 30% by weight and most preferably 15% to about 25% by weight of the liquid monomer component of the resin system.

The benefit of the present invention is that the diallyl ether of a substantially aromatic radical combined with bis(alkenylphenoxy) ether of a substantially aromatic radical is more resistant to crystallization than the combination of the traditional 2,2'-diallyl bisphenol A with bis(alkenylphenoxy) ether of a substantially aromatic radical. The preferred diallyl ether of a substantially aromatic radical is diallyl bisphenol A. This resistance to crystallization is possibly due to the monomers' similarities in that they are both non-polar and therefore, improve tack, which is diminished or eliminated when the resin system crystallizes.

The traditional co-reactant 2,2'-diallylbisphenol A (marketed by Huntsman as Matrimid 5292B) and others are described in U.S. Pat. No. 4,100,140 and U.S. Pat. No. 5,003,018 and schematically represented below in Formula 2.

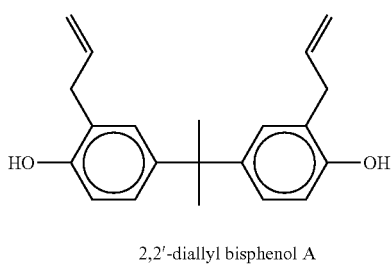

Formula 2

2,2'-diallyl bisphenol A

The bis(alkenylphenoxy) ether of a substantially aromatic radical is preferably 4,4'-(2-propenylphenoxy) benzophenone (TM123), and more preferably is a monomer. These comonomers react with a BMI to form a cured network with high Tg and excellent oxidative stability.

There are two main challenges with the use of bis(alkenylphenoxy) ether of a substantially aromatic radical. First, the room temperature (~75° F.) viscosity is about 10,000,000 poise. To provide the prepreg tack necessary for assembling prepreg plies for a composite part, a lower viscosity comonomer or additive is needed. Traditional 2,2'-diallyl bisphenol A comonomer has a viscosity of about 250 poise and has good mechanical and thermal oxidative performance. Unfortunately, bis(alkenylphenoxy) ether of a substantially aromatic radical is not stable when dissolved into 2,2'-diallyl bisphenol A and readily crystallizes. This crystallization increases the viscosity of the resin thus, making it difficult to use as a prepreg resin due to the lack of tack. The present invention resolves this issue by utilizing a comonomer that has low viscosity, does not crystallize with bis(alkenylphenoxy) ether of a substantially aromatic radical, and has good thermal and oxidative characteristics.

The group of bis(alkenylphenoxy) ethers of a substantially aromatic radical acceptable for the present invention is shown below as Formula 3.

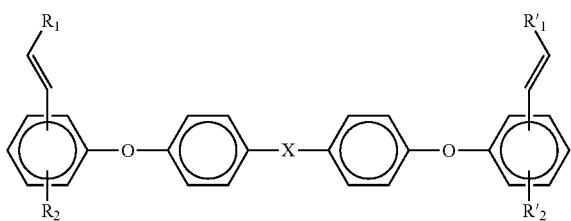

Formula 3 bis(alkenylphenoxy) ether of a substantially aromatic radical

Wherein $R_1$, $R_1'$=hydrogen, alkyl, or aromatic; $R_2$, $R_2'$=hydrogen, halogen, alkyl, phenoxy, or alkyloxy; and where X would be a direct bond or one of the following functional groups:

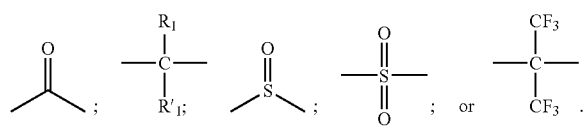

The bis(alkenylphenoxy) ether of a substantially aromatic radical compound can be in an amount up to about 90% by weight of the liquid component of the resin system and is preferably between about 10% to about 90% and more preferably between about 60% and 80% by weight of the liquid monomer component. Preferably the bis(alkenylphenoxy) ether of a substantially aromatic radical compound is a bis (propenylphenoxy) ether of a substantially aromatic radical and most preferably is 4,4'-(2-propenylphenoxy) benzophenone (TM123).

The present invention is preferably used in combination with a solid particulate substantially aromatic BMI, preferably for example, MDA-BMI or TDA-BMI. U.S. Pat. Nos. 5,003,018 and 5,747,615 more fully disclose a slurry mixing process where some or all of the substantially aromatic BMI's are ground and added to the resin composition as fine particles.

The present invention allows for higher total amounts of substantially aromatic BMI to be incorporated into the formulation. Substantially aromatic BMI may be from about 20 wt % to about 90 wt % or more of the total resin formulation, preferably between 50 wt % and 90 wt %, and most preferably between about 60 wt % and about 75 wt %.

The particulate BMI is characterized in having an average particle size of less than 50 μm in diameter, preferably where more than 90% by weight are less than 40 μm and most preferably where more than 90% by weight are less than 20 μm.

A further benefit of the diallyl ether of a substantially aromatic radical curing agent in the liquid monomer component is that it affords the option of adding high molecular weight thermoplastics. The present invention allows for the addition of thermoplastics in the amount of about 1 wt % to about 20 wt %, preferably 1 wt % to about 5 wt % of the total resin formulation.

The present invention can be used with any BMI resin system to improve handling characteristics.

One of the further benefits of the present invention is the capability of resin transfer molding processing.

By the term "tack" is meant a property needed when plying the layers of prepregs together to later compress and heat form into composite parts and its ability to adhere to itself. Tack on prepreg is mainly a function of the viscosity of the resin. As the viscosity of the resin is lowered the resin is able to better wet-out a surface which increases the amount of energy needed to remove the prepreg. Prepreg tack is a critical physical property of the prepreg and is needed to make highly contoured parts.

By the term "drape" is meant a property needed when plying the layers of prepreg together and is the ability of the prepreg to form into tight radii needed for complex parts. As with tack, resin viscosity affects prepreg drape. As the resin viscosity is increased the resin becomes stiffer which decreases the drape of the prepreg. This make it harder to conform to contours and in some cases, this lack of drape can trap air and cause porosity.

By the term "bismaleimide" is also meant the closely related nadicimides and allylnadicimides. Preferred bismaleimides are the bismaleimides of toluenediamine, methylenedianiline, aliphatic diamines, isophorone diamine, and the like. Further examples of suitable bismaleimides are disclosed in U.S. Pat. Nos. 4,644,039 and 5,003,018. Generally, the bismaleimides are copolymerized with an alkenylphenol comonomer such as 2,2'-diallylbisphenol A, 2,2'-dipropenylbisphenol A, eugenol, etc. When bismaleimides are the major thermosetting resin it is frequently desirable to incorporate a low viscosity epoxy resin, for example a bisphenol F epoxy or resorcinol based epoxy to the resin system in minor amounts.

By the term "free radical inhibitor" is meant a compound for reducing the reactivity of the resin components. Appropriate inhibitors, are known in the art and the present invention may further incorporate the use of inhibitors as more fully described in U.S. Pat. No. 5,955,566.

By the term "liquid phase component" or "liquid monomer component" is meant a reactive resin system which is liquid at the slurry mixing or mixing process temperature. This liquid phase component contains two or more reactive monomers of the same or different chemical functionalities, cross-curative monomeric or oligomeric modifiers, or in addition to such components, other system components such as plasticizers, fillers, pigments, thermoplastic tougheners, rheology control agents, tackifiers, and the like.

A myriad of possible liquid monomers exist. The following types of liquid monomers may be considered as typical, but not limiting.

Unsaturated polyesters are suitable liquid monomers. These polyesters must be liquid at the slurry temperature. Such polyesters are prepared by esterifying a polybasic acid and polyfunctional alcohol at least one of which contains ethylenic or acetylenic unsaturation. Such polyesters, to have the lowest melting points, are often synthesized from mixtures of acids and alcohols. Examples of such unsaturated polyesters may be found in *Unsaturated Polyesters* by Herman Boenig, Elsevier, New York, 1964. Many commercial resins of this type are available, often containing other polymerizable species such as styrene.

Isocyanates may be suitable liquid monomers. Examples of suitable isocyanates are the toluene isocyanates, for example 2,4-, and 2,6-toluenediisocyanates and their mixtures; the diisocyanatodiphenylmethanes, for example 2,2'-, 2,4'-, 4,4'-, and 3,3'-diisocyanatodiphenylmethane and their mixtures; isophorone diisocyanate, and polyphenylenepolymethylenepolyisocyanate.

Bismaleimides may be suitable liquid monomers, particularly eutectic mixtures of two or more bismaleimides. Such bismaleimides are well known items of commerce and may be prepared, for example, through the reaction of maleic anhydride with a suitable di- or polyamine. Useful, for example, are the maleimides of the toluenediamines, the phylenediamines, the diaminodiphenylmethanes, diaminodiphenyloxides, diaminodiphenylsulfides, diaminodiphenysulfones, and their analogues. Also suitable are the maleimides of amine terminated polyarylene oligomers having interspersed oxide, sulfide, sulfone, or carbonyl groups as taught by U.S. Pat. Nos. 4,175,175, 4,656,208 and EP-A-0, 130,270.

Aliphatic bismaleimides of di- and polyamines are also suitable. Examples include, but are not limited to the following: those derived from the trimethylhexanediamines (TMH-BMI), hexanediamine (hexamethylene diamine bismaleimide or HMDA-BMI), octanediamine, decanediamine, 1,4-diaminocyclohexane, and isophorone diamine and the like.

Cyanate resins are also suitable liquid monomers. Such resins are prepared through the reaction of a cyanogen halide with an aromatic di- or polyol such as recorcinol, hydroquinone, dihydroxynaphthalene, the cresolic and phenolic novalak, and the various bisphenols. Eutectic mixtures of such cyanates are also feasible as liquid monomers.

The above-identified liquid monomers serve to illustrate the variety of chemical types which are suitable for the practice of the subject invention. Other monomers having other chemical functional groups which can meet the requirements of being liquid and substantially unreactive at the slurry mixing temperatures will readily suggest themselves to those skilled in the art.

Mixtures of various liquid monomers may also be used. Examples of such mixtures include epoxy resins and di- or polyphenols; epoxy resins and cyanate resins; cyanate resins and bismaleimide resins, and epoxy resins and isocyanate resins. Such resin mixtures should be capable of mutual solubility at the slurry mixing temperature; should not react substantially at the slurry mixing or mixing temperature; and where any of the components are solids, those components should not be present in an amount appreciably in excess of the storage temperature solubility of that component, or to such a degree as to elevate the glass transition temperature of the uncured resin system to unacceptable levels.

The liquid phase component reactive monomers may be co-reactive in that they do not react with each other, but react upon cure with themselves or other system components, or they may be cross-curative, in that they react with each other upon reaching the cure temperature. The reactive monomers of the liquid monomer component, however, must not react to any substantial degree during the slurry mixing process, or premature advancement of the resin may occur.

Modifiers such as the 2,2'-diallybisphenols and the 2,2'-dipropenylbisphenols, or allylphenoxy, propenylphenoxy, allylphenyl and propenyphenyl-terminated oligomeric modifiers may also be incorporated into the liquid monomer component.

Other ingredients may also be added into the liquid monomer component. Where such other modifiers are solids, as is the case with some of the oligomeric modifiers, the quantity contained in the liquid phase must be such that the storage temperature solubility of the modifier is not appreciably exceeded.

By "slurry compatible solid" is meant a reactive solid monomer or oligomer or a thermoplastic toughener. If the thermoplastic is soluble, it will be soluble at a temperature higher than the slurry mixing temperature, but not at the slurry mixing temperature itself. Alternatively, the thermoplastic may be substantially soluble at the slurry mixing temperature, but the slurry process may be performed over a time such that only a minimal amount of the thermoplastic will dissolve. In either case, the thermoplastic must be a solid at the slurry mixing temperatures.

If the slurry compatible solid is a reactive monomer or oligomer it will have a molecular weight greater than 250 Daltons and preferably will have the same reactive functionality as the majority of the reactive chemical monomers in the finished resin system. The reactive slurry compatible solid will also be chemically and physically compatible with the liquid comonomer in the sense hereinafter designated.

By the term "slurry mixing process temperature" is meant any temperature at which mixing may occur and maintain the intended solid phase component in substantially the solid phase. This temperature may be from 70° F. to 280° F., preferably about 120° F. to about 200° F., and most preferably between about 140° F. and 160° F.

By the term "mixing process temperature" is meant any temperature at which mixing may occur and maintain substantially a single liquid phase of the resin mixture and can similarly be from 70° F. to 280° F., preferably about 120° F. to about 200° F., and most preferably between about 140° F. and 160° F.

It is desirable that the reactive monomers will not react to any substantial degree at the slurry mixing process temperature or mixing process temperature.

By the term "epoxy resins" is meant epoxy resins having functionalities of about two or greater are suitable. Examples of liquid epoxy resins are contained in many references, such as the treatise *Handbook of Epoxy Resins* by Lee and Neville, McGraw-Hill, and *Epoxy Resins, Chemistry and Technology*, May, Ed., Marcel Dekker, ©1973. Included among these liquid systems are many of the DGEBA and DGEBF resins, the lower molecular weight phenolic and cresolic novalac based resins, and the trisglycidyl aminophenol resins. Mixtures of these liquid epoxy resins and minor amounts of solid epoxy resins such as tetraglycidyl methylenedianiline (TG-MDA) or other solid epoxy resins may also be useful. In this case, the amount of solid epoxy resin should be such that neither the storage temperature solubility of the solid epoxy in the remaining liquid monomers is appreciably exceeded, nor is the glass transition temperature of the uncured resin system raised to an unacceptably high value.

Mixtures of epoxy resins and epoxy curing agents which are soluble in the epoxy and unreactive or poorly reactive at the slurry temperature may also be used. Examples of such systems are those containing one or more of the various glycidyl-functional epoxy resins, and aromatic amine curing agents such as diaminodiphenylmethane, diaminodiphenylsulfide, diaminodiphenyloxide, and diaminodiphenylsulfone, particularly the latter. However, as some of these aromatic amines are solids, the same limitation applies to them as applies to mixtures containing solid epoxies: the amount of solid curing agent dissolved in the liquid monomer component should be such that the storage temperature solubility of the curing agent in the remaining liquid monomer components is not exceeded, and the glass transition temperature of the uncured resin system should not be raised to unacceptable values.

By the term "slurry mixing process" is meant a slurry mixing process under a variety of conditions. Preferably, the slurry compatible solid is finely ground by conventional methods and dispersed into the additional resin components by suitable dispersing means. For example, the solid may be ground to fine particle sizes in a jet mill as disclosed in U.S. Pat. No. 4,607,069. Most preferably, the solid is ground to a particle size less than 50 µm, preferably less than 40 µm, and most preferably less than 20 µm where more than 90% of the particles are less than the desired particle size. The finely ground resin may then be dispersed, for example using a high shear mixer, at temperatures ranging from below ambient to over 200° C. depending upon the reactivities and viscosities of the liquid monomer components.

Alternatively, the slurry compatible solid may be added to the liquid monomer in small particles ranging from 50 µm, to 3 mm in size, with further size reduction accomplished by use of high shear mixing. An apparatus suitable for such high shear size reduction are the ULTRA-TURRAX® mixers available from IKA-Maschinenbau Janke and Kunke, GMBH and Co. KG., D-7812 Bad Kruzinger 2, Federal Republic of Germany. Such high shear mixers generate considerable heat, and thus cooling is often necessary to prevent the slurry mixing temperature from rising so high that the solid dissolves in the liquid monomers or that premature reaction occurs.

An additional means of slurry mixing which is possible when the solid component has a relatively steep solubility curve in the liquid monomers and does not tend to form supersaturated solutions, is to melt the solid monomer in a separate container and add it to the liquid monomers while cooling under high shear. With some systems, it may even be possible to melt all the components together and cool while mixing under high shear. This method is not suitable, however, when supersaturation is likely, as the resulting heat-curable resin system is at most metastable and may alter its morphology in an unpredictable manner due to crystallization of the supersaturated components. The temperature of the liquid monomer using this technique, must be below the solidification temperature of the slurry compatible solid when mixing ceases, and in such cases, the "slurry mixing temperature" is this latter temperature.

In any event, following the slurry mixing process, the resulting resin system consists of a continuous phase containing the liquid monomer(s) and a discontinuous (solid) phase containing a major portion of the slurry compatible solid in the form of particles having an average size where more than 90% by weight are less than about 50 µm, preferably less than 40 µm, and particularly, less than 20 µm. The particle size of the discontinuous phase may vary from one system to another, but it is important in the case of prepregging resins that the mean particle size be less than the distance between adjacent fiber bundles or filaments.

By the term "thermoplastics" is meant the preferred engineering thermoplastics such as the polyimides, polyetherimides, polyesterimides, polysulfides, polysulfones, polyphenylene oxides, polyethersulfones, polyetherketones, polyetheretherketones, polyetherketoneketones, polyketonesulfones, polyamides, polyesters and similar polymers. Such thermoplastics preferably have glass transition temperatures greater than 150° C.

The following non-limiting examples are illustrative of the present invention and are not to be construed as to limiting the scope thereof in any manner.

Example 1

The following experiment evaluated the amount of crystals that were formed by replacing the diallyl ether of bisphenol A of the present invention for the traditional 2,2'-diallyl bisphenol A mixed with bis(propenylphenoxy) ether of a substantially aromatic radical and slurry mixed in a particulate bismaleimide resin such as MDA-BMI powder.

A first formulation of a prior art resin formulation was made by adding 50 grams of 2,2'-diallyl bisphenol A at 80° F. Next, 50 grams of 4,4'-(2-propenylphenoxy) benzophenone (TM123) was preheated at 170° F. and mixed into the resin. The temperature of the resulting liquid resin mixture was increased to 200° F. Next, 100 grams of bismaleimide particles (MDA-BMI) was slurry mixed into the liquid resin mixture. The resulting slurry mixed resin mixture was cooled to room temperature.

A second formulation of the present invention was made by adding 50 grams of diallyl ether of bisphenol A at 80° F. Next, 50 grams of 4,4'-(2-propenylphenoxy) benzophenone (TM123) was preheated at 170° F. and mixed into the resin. The temperature of the resulting liquid resin mixture was increased to 200° F. Next, 100 grams of MDA-BMI was slurry mixed into the liquid resin mixture. The resulting slurried resin mixture was cooled to room temperature.

Three tests were run on these two slurry mixed resin mixtures to evaluate crystallization formation. First, the resins were allowed to sit at room temperature with no mixing for 1-2 weeks. Second, the resin mixtures were seeded with 4,4'-(2-propenylphenoxy) benzophenone (TM123) crystals and allowed to stand at room temperature with no mixing for 1-2 weeks. And lastly, the resin mixtures were heated to 160° F. with no mixing for 2-3 hours.

All three evaluations of the 2,2'-diallyl bisphenol A curing agent visually showed a large amount of crystallization of the resin. This would eliminate the tack on the prepreg.

All three evaluations of the diallyl ether of bisphenol A curing agent visually showed no crystal formation versus the unacceptable amount of crystal formation using 2,2'-diallyl bisphenol A curing agent. The only difference was the replacement of diallyl ether of bisphenol A curing agent for 2,2'-diallyl bisphenol A curing agent.

The evaluations indicated that using diallyl ether of bisphenol A as the curing agent prevents crystallization and is preferred when used with 4,4'-(2-propenylphenoxy) benzophenone (TM123), over 2,2'-diallyl bisphenol A curing agent.

Example 2

The viscosity and tack of prepregs made using a prior art system, a modified version of a prior art system and the present invention were evaluated to compare the viscosity and tack of a final prepreg made from each.

A first formulation was made based on the prior art system by adding 74.87 grams of 2,2'-diallyl bisphenol A (Matrimid 5292B marketed by Huntsman) at 190° F. in an aluminum mixing can. Next, 0.6 grams of 1,4-napthaquinone was mixed into the resin. Next, 224.53 grams 4,4'-(2-propenylphenoxy) benzophenone (TM123) was mixed into the resin. The resin was 100% homogenous and dissolved. The resin was cooled to room temperature.

Room temperature (27° C.) viscosity was measured on the uncured neat resin using a ARES-3 rheometer with the following settings: parallel plate, 25 mm diameter plates, 0.5 mm gap, frequency of 10 rad/s. strain of 50% and time of 10 minutes. The room temperature viscosity was 100,000 poise.

The resin was stored at room temperature for 2 weeks to evaluate tack stability. Some opaque crystals were identified visually without magnification as the individuals were on the order of about 1 mm. The resin crystallization on the surface reduced the tack significantly.

A second formulation was made modifying the prior art resin system by adding 149.7 grams of 2,2'-diallyl bisphenol A (Matrimid 5292B) at 190° F. in an aluminum mixing can. Next, 0.6 grams of 1,4-napthaquinone was mixed into the resin. Next, 149.7 grams of 4,4'-(2-propenylphenoxy) benzophenone (TM123) was mixed into the resin. The resin was 100% homogenous and dissolved. The resin was cooled to room temperature. The room temperature resin viscosity was 10,000 poise as measured above.

The resin was stored at room temperature for 2 weeks to evaluate tack stability. The crystallization was again visually assessed and the approximately 1 mm crystals were agglomerated to such an extent that the crystallization fully covered the exposed resin surface. The extent of crystallization reduced tack to an unusable level.

A third formulation was made based on the present invention by adding 74.87 grams of diallyl ether of bisphenol A (Matrimid 2292) at 190° F. in an aluminum mixing can. Next, 0.6 grams of 1,4-napthaquinone was mixed into the resin. Next, 224.53 grams of 4,4'-(2-propenylphenoxy) benzophenone (TM123) was mixed into the resin. The resin was 100% homogenous and dissolved. The resin was cooled to room temperature.

Room temperature (27° C.) viscosity was measured on the uncured neat resin. The room temperature viscosity was 615 poise as measured above.

The resin was stored at room temperature for 2 weeks to evaluate tack stability. The crystallization was again visually assessed with virtually no crystallization observed. The tack was stable and virtually unchanged over the two weeks.

Therefore, while the modification of the prior art bismaleimide resin by simply adding more 2,2'-diallyl bisphenol A did further reduce the viscosity of the resulting resin composition, the addition in fact further impaired the tack due to crystallization making the resin unusable. In contrast, the resin of the present invention not only significantly reduced the resin composition viscosity, it also provided optimal tack.

Example 3

Elevated temperature, thermal durability tests were performed on composites based on the present invention as well as the prior art system to demonstrate that while the tack and viscosity of the present invention are superior to the prior art system, there is no loss in thermal durability performance.

A first comparative formulation was made based on the prior art by adding 134.7 grams of 2,2'-diallyl bisphenol A (Matrimid 5292B) resin at 190° F. to an aluminum mixing can. Next, 1.2 grams of 1,4-napthaquinone was mixed into the resin. Next, 404.1 grams of 4,4'-(2-propenylphenoxy) benzophenone (TM123) was mixed into the resin. The resin is 100% homogenous and dissolved at this stage. Next, 660 grams of 20 μm particle size BMI (90% of particles less 20 μm in size) was slurry mixed into the resin. The resin is cooled to room temperature.

The finished resin system was coated onto silicone coated release paper and used to prepare a carbon/graphite prepreg.

A laminate was made by plying together 8 plies of this prepreg. It was cured using an autoclave with 85 psi at 375° F. for 6 hours. A free-standing post-cure was completed at 440° F. in an oven for 6 hours.

The laminate was cut into 4"×4" samples and put into a 450° F. oven for 4000 hours. The sample was weighed before and after aging after various periods of time during aging to determine the percent weight loss. The percent weight loss was 2.0% after 4000 hours.

A second comparative formulation was made based upon the present invention by adding 134.7 grams of diallyl ether of bisphenol A (Matrimid 2292) resin at 190° F. to an aluminum mixing can. Next, 1.2 grams of 1,4-Napthaquinone was mixed into the resin. Next, 404.1 grams of 4,4'-(2-propenylphenoxy) benzophenone (TM123) was mixed into the resin. The resin was 100% homogenous and dissolved at this stage. Next, 660 grams of 20 μm particle size BMI (90% of particles less 20 μm in size) was slurry mixed into the resin. The resin was cooled to room temperature of 27° C.

The finished resin system was coated onto silicone coated release paper and used to prepare a carbon/graphite prepreg.

A laminate was made by plying together 8 plies of this prepreg. It was cured using an autoclave with 85 psi at 375° F. for 6 hours. A free-standing post-cure was completed at 440° F. in an oven for 6 hours.

The laminate was cut into 4"×4" samples and put into a 450° F. oven for 4000 hours. The sample was weighed before and after aging after various periods of time during aging to determine the percent weight loss. The percent weight loss was 1.9%.

The weight loss of the First Formulation and the Second Formulation at various times during the aging test are shown in Table A below.

The viscosity of the First Formulation and the Second Formulation at about room temperature are shown in Table B.

TABLE A

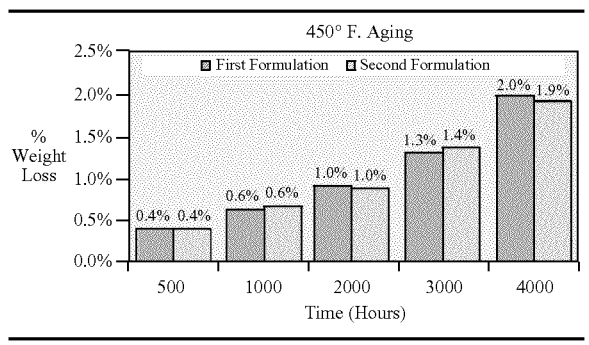

450° F. Aging

TABLE B

| Components | First Formulation | Second Formulation |
|---|---|---|
| Matrimid 5292B | 11.25 | 0 |
| Matrimid 2292 | 0 | 11.25 |
| TM123 | 33.75 | 33.75 |
| NQ | 0.1 | 0.1 |
| BMI-H | 0 | 0 |
| Viscosity (Poise) | 100000 | 615 |

What is claimed is:

1. A thermosetting bismaleimide resin system, comprising:
a liquid phase and a solid phase;
the liquid phase comprising a non-crystallizing combination of a diallyl ether of bisphenol A and a bis(alkenylphenoxy) ether of a substantially aromatic radical; and
the solid phase comprising a substantially aromatic bismaleimide as a particle in a slurry with the liquid phase.

2. The thermosetting bismaleimide resin system of claim 1 wherein the bismaleimide, the diallyl ether of bisphenol A, and the bis(alkenylphenoxy) ether of a substantially aromatic radical are substantially monomers.

3. The thermosetting bismaleimide resin system of claim 1 wherein the bis(alkenylphenoxy) ether of a substantially aromatic radical is 4,4'-(2-propenylphenoxy) benzophenone.

4. The thermosetting bismaleimide resin composition of claim 1 further comprising a thermoplastic.

5. The thermosetting bismaleimide resin composition of claim 1 wherein the substantially aromatic bismaleimide is a bismaleimide incorporating 4,4'-methylenedianaline.

6. The thermosetting bismaleimide resin composition of claim 1 wherein the substantially aromatic bismaleimide is a bismaleimide of toluene diamine.

7. The thermosetting bismaleimide resin composition of claim 1 wherein the slurry mixing temperature is between 140° F. and 180° F.

8. The thermosetting bismaleimide resin composition of claim 1 wherein 90 wt % to 100 wt % of the solid phase substantially aromatic BMI have a particle size of 40µ or less.

9. The thermosetting bismaleimide resin composition of claim 1 wherein 90 wt % to 100 wt % of the solid phase substantially aromatic bismaleimide have a particle size of 20µ or less.

10. The thermosetting bismaleimide resin composition of claim 1 further comprising a free radical inhibitor.

11. The thermosetting bismaleimide resin composition of claim 1 wherein the diallyl ether of bisphenol A is present in an amount of 2 wt % to 30 wt % and the bis(alkenylphenoxy) ether of a substantially aromatic radical is present in an amount of 15 wt % to 60 wt %.

12. The thermosetting bismaleimide resin system of claim 11 wherein the bis(alkenylphenoxy) ether of a substantially aromatic radical is 4,4'-(2-propenylphenoxy) benzophenone.

13. A thermosetting bismaleimide resin composition of claim 1, wherein the non-crystallizing combination of a diallyl ether of bisphenol A and a bis(alkenylphenoxy) ether of a substantially aromatic radical is non-crystallizing for two weeks.

14. A composite comprising the thermosetting bismaleimide resin system of claim 11, wherein the composite displays thermal durability at about 232° C. for at least 2000 hours wherein the thermal durability is measured by weight loss of less than 2% at 232° C.

15. A composite comprising the thermosetting bismaleimide resin system of claim 11, wherein the composite displays thermal durability at about 176° C. for at least 8000 hours.

* * * * *